United States Patent
Ikoshi et al.

(10) Patent No.: US 8,702,199 B2
(45) Date of Patent: Apr. 22, 2014

(54) MAINTENANCE LIQUID, INK SET, AND MAINTENANCE METHOD

(75) Inventors: Masao Ikoshi, Kanagawa (JP); Mika Imamura, Kanagawa (JP); Ryo Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 140 days.

(21) Appl. No.: 12/869,780

(22) Filed: Aug. 27, 2010

(65) Prior Publication Data

US 2011/0069114 A1    Mar. 24, 2011

(30) Foreign Application Priority Data

Sep. 18, 2009    (JP) .................................. 2009-218013

(51) Int. Cl.
- *B41J 2/165* (2006.01)
- *B41J 2/16* (2006.01)
- *B41J 2/01* (2006.01)

(52) U.S. Cl.
CPC ............ *B41J 2/16552* (2013.01); *B41J 2/1606* (2013.01); *B41J 2/01* (2013.01)
USPC .................. 347/28; 347/45; 347/95

(58) Field of Classification Search
CPC ......... B41J 2/16552; B41J 2/1606; B41J 2/01
USPC .............. 347/21, 95–100, 22, 28, 29, 45, 47; 106/31.13, 31.6; 523/160, 161; 160/31.13, 31.6
See application file for complete search history.

(56) References Cited

U.S. PATENT DOCUMENTS

| | | | | |
|---|---|---|---|---|
| 3,037,886 A | * | 6/1962 | Ryznar | 134/4 |
| 4,612,135 A | * | 9/1986 | Wenzel | 510/423 |
| 4,643,948 A | * | 2/1987 | Diaz et al. | 428/422 |
| 4,769,170 A | | 9/1988 | Omori et al. | |
| 5,136,310 A | * | 8/1992 | Drews | 347/45 |
| 5,623,294 A | * | 4/1997 | Takizawa et al. | 347/98 |
| 5,825,380 A | * | 10/1998 | Ichizawa et al. | 347/28 |
| 6,604,809 B2 | * | 8/2003 | Katsuragi et al. | 347/28 |

(Continued)

FOREIGN PATENT DOCUMENTS

| | | |
|---|---|---|
| JP | 62-95365 | 5/1987 |
| JP | 9-39260 | 2/1997 |

(Continued)

OTHER PUBLICATIONS

Partial English language translation of the following: Office action dated Nov. 12, 2013 from the Japanese Patent Office in a Japanese patent application corresponding to the instant patent application. This office action translation is submitted now in order to supplement the understanding of patent document JP2005-007703, JP9-39260, JP2007-130854, JP62-95365 and JP2005-154644 which are cites in the office action and are being disclosed in the instant information Disclosure Statement.

*Primary Examiner* — Matthew Luu
*Assistant Examiner* — Rut Patel
(74) *Attorney, Agent, or Firm* — SOLARIS Intellectual Property Group, PLLC

(57) ABSTRACT

The invention provides a maintenance liquid, containing water, a water-soluble organic solvent, and at least one of a water-soluble silicate represented by Formula (1) or colloidal silica:

$$xM_2O \cdot ySiO_2, \qquad \text{Formula (1)}$$

wherein, in Formula (1), M represents K or Na, x represents 1 or 2, and y represents an integer of 1 to 5.

10 Claims, 2 Drawing Sheets

(56) References Cited

U.S. PATENT DOCUMENTS

| | | | |
|---|---|---|---|
| 6,746,114 B2 * | 6/2004 | Takahashi et al. | 347/100 |
| 7,370,952 B2 * | 5/2008 | Inoue et al. | 347/100 |
| 7,597,436 B2 * | 10/2009 | Momose et al. | 347/95 |
| 7,686,417 B2 * | 3/2010 | Ota | 347/28 |
| 8,038,254 B2 * | 10/2011 | Arai et al. | 347/28 |
| 2005/0018023 A1 * | 1/2005 | Momose et al. | 347/95 |
| 2007/0132807 A1 * | 6/2007 | Ota | 347/22 |
| 2007/0134451 A1 * | 6/2007 | Hakamada et al. | 428/32.38 |
| 2007/0222811 A1 * | 9/2007 | Yanagi | 347/21 |
| 2007/0229577 A1 * | 10/2007 | Morimoto | 347/21 |
| 2008/0160154 A1 * | 7/2008 | Jacquinot et al. | 426/592 |
| 2009/0202724 A1 * | 8/2009 | Arai et al. | 427/256 |
| 2010/0040782 A1 * | 2/2010 | Arai et al. | 427/256 |
| 2010/0062962 A1 | 3/2010 | Momose et al. | |
| 2010/0203247 A1 * | 8/2010 | Kariya et al. | 427/256 |
| 2011/0050795 A1 * | 3/2011 | Arai et al. | 347/28 |
| 2011/0069110 A1 * | 3/2011 | Matsumoto et al. | 347/21 |
| 2011/0074866 A1 * | 3/2011 | Imamura et al. | 347/21 |

FOREIGN PATENT DOCUMENTS

| | | |
|---|---|---|
| JP | 2005-007703 | 1/2005 |
| JP | 2005-154644 | 6/2005 |
| JP | 2007-130854 | 5/2007 |
| JP | 2008-274016 A | 11/2008 |
| JP | 2009-12361 A | 1/2009 |

* cited by examiner

MAINTENANCE LIQUID, INK SET, AND MAINTENANCE METHOD

CROSS-REFERENCE TO RELATED APPLICATION

This application claims priority under 35 USC 119 from Japanese Patent Application No. 2009-218013 filed on Sep. 18, 2009, the disclosure of which is incorporated by reference herein.

BACKGROUND OF THE INVENTION

1. Field of the Invention

The present invention relates to a maintenance liquid, an ink set, and a maintenance method.

2. Related Art

As a liquid droplet jetting head for jetting liquid droplets, an inkjet head to be mounted on an inkjet recording device is known, for example. The inkjet head generally has a nozzle substrate in which a plurality of nozzle openings for jetting ink droplets are formed, a jetting chamber joined to the nozzle substrate to communicate with the nozzle openings between the nozzle substrate and the same, and a cavity substrate in which an ink flow path, such as a reservoir, is formed, in which ink liquid is jetted from selected nozzle openings by applying a pressure to the jetting chamber by an actuator. Examples of driving members, a system utilizing static electricity power, a piezo-electric system by a piezo-electric element, and a bubble jet (Registered Trademark) system utilizing a heating element.

In contrast, in an inkjet recording device for jetting ink from a minute jetting opening, ink, wastes, and the like adhere to the vicinity of the jetting opening of a recording head during recording, which sometimes deteriorates the stability of ink jetting. As time progresses, the adhered ink in the vicinity of the jetting opening increases the viscosity or is solidified, which sometimes causes clogging in the jetting opening.

In order to address the problems, the inkjet recording device has a system for cleaning the recording head before, during, or after recording. As one of the systems, the jetting surface of the recording head (surface on which the jetting opening is disposed) is wiped off and cleaned with a wiper.

Moreover, a maintenance method including capping a jetting opening of each of at least one pigment ink and a clear ink containing at least one water-soluble organic solvent that is a good solvent for the pigment ink with the same cap, and performing suction by a suction member connected to the cap.

Moreover, a maintenance method for washing a path in preparation for the case of prolonged suspension or clogging is disclosed.

In contrast, some former nozzle substrate have an intermediate film and a water-repellent film formed on the intermediate film on an ink jetting surface to which ink is jetted from nozzle openings.

Furthermore, in the inkjet recording device, members constituting an ink flow path or members to be used for a joining portion of each member, such as the ink flow path and a nozzle plate, have also been diversified.

However, in printing of photographs or images for which needs have increased recently, not only an increase in the density of a nozzle of an inkjet head or an increase in the driving rate but also the necessity of high performance inks, such as a high coloring ink or a weather resistant, arises, and, considering the development of inkjet techniques to industrial application, the necessity of dealing with various inks also arises.

In order to deal with such technical needs, as a measure for maintaining high durability even when various inks are used, the approach from members, such as an improvement of the water repellency of the outer surface, has been examined and a maintenance liquid for suppressing degradation of members constituting the inkjet recording device and washing ink has also been examined.

Specifically, for the purpose of preventing corrosion and degradation of members constituting a liquid flow path and improving chargeability of liquid to be jetted, as a charge liquid to be charged in a liquid flow path of a head device for a liquid jetting device for jetting liquid droplets, a charge liquid for a liquid jetting device containing a corrosion and elution inhibitor for suppressing the corrosion and elution of metals in the liquid flow path is disclosed (e.g., Japanese Patent Application Laid-Open (JP-A) No. 2009-12361).

Moreover, a maintenance liquid for inkjet printers containing at least one specific glycol ether or glycol ester and having a dissolved oxygen amount of 45 mg/L to 10 mg/L is disclosed as a liquid having a member corrosion prevention ability and excellent washability is disclosed (e.g., JP-A No. 2008-274016).

SUMMARY

The present invention has been made in view of the above circumstances and provides a maintenance liquid containing a water-soluble organic solvent and at least one of a water-soluble silicate represented by Formula (1) or colloidal silica:

$$xM_2O \cdot ySiO_2 \qquad \text{Formula (1)}$$

(wherein, in Formula (1), M represents K or Na, x represents 1 or 2, and y represents an integer of 1 to 5.).

BRIEF DESCRIPTION OF THE DRAWINGS

Exemplary embodiments of the invention will be described in detail based on the following figures, wherein.

DETAILED DESCRIPTION OF THE INVENTION

Figure 1:
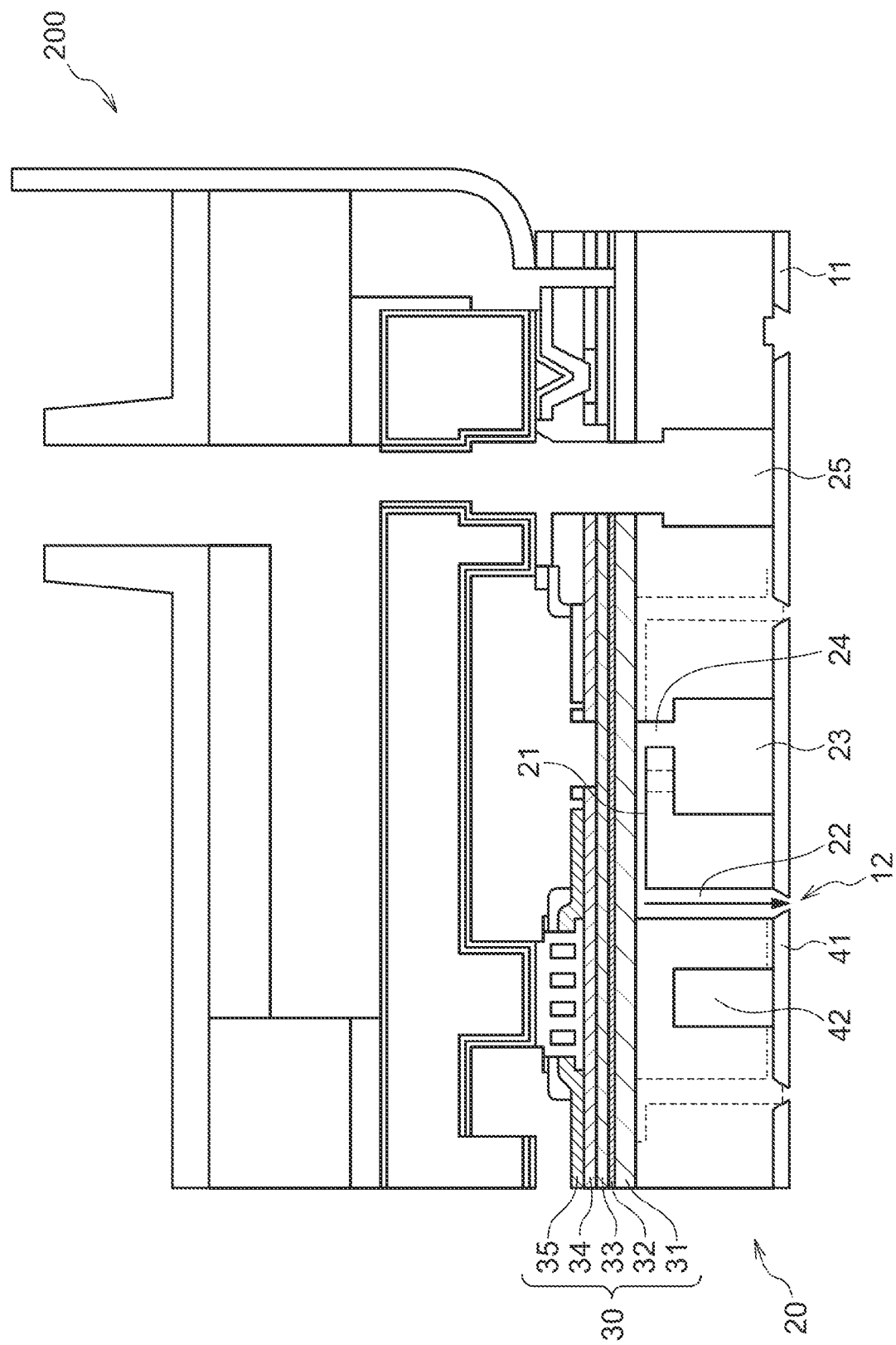
FIG. 1 is a schematic cross sectional view showing an example of the internal structure of an inkjet head.

Hereinafter, a maintenance liquid, an ink set using the same, and a maintenance method of the present invention will be described in detail.

The maintenance liquid of the invention contains water, a water-soluble organic solvent, and at least one of a water-soluble silicate represented by Formula (1) or colloidal silica. The maintenance liquid of the invention may further contain other ingredients, such as surfactants.

$$xM_2O \cdot ySiO_2 \qquad \text{Formula (1)}$$

In Formula (1), M represents K or Na, x represents 1 or 2, and y represents an integer of 1 to 5.

Since ink is jetted from a nozzle having a diameter as minute as about 10 μm to 50 μm in an inkjet recording method, volatilization of low-boiling-point solvents, separation of colorants, an increase in the viscosity of ink due to aggregation or the like, and generation of deposits are likely to occur in the vicinity of the nozzle tip and ink residues due to mist or the like remain in the vicinity of the nozzle tip, which sometimes cause defects, such as printing disorder or nozzle clogging. These problems are likely to occur particularly after devices are suspended over a long period of time.

The maintenance liquid of the invention can be preferably used as measures for solving the problems in any method of (1) a method for washing the inside of an ink flow path when defects occur, (2) a method for replacing ink by the maintenance liquid in advance when prolonged suspension is supposed, (3) a method for applying the maintenance liquid to a nozzle surface and washing, and (4) a method for using the maintenance liquid as a charge liquid for a cap member to be abutted to a recording head in such a manner as to surround a nozzle and using the same as a moisturizing liquid for preventing dryness of ink or as an immersion liquid. In particular, the maintenance liquid of the invention exhibits significant effects in pigment inks containing colorants in which pigment particles are dispersed with resin dispersants. Here, when the method (3) above is used, it is preferable to wipe the nozzle surface with elastic materials, such as a blade wipe, simultaneously with or after the application of the maintenance liquid.

According to the invention, even when the pigment inks containing the pigments that are dispersed with resin dispersants as colorants has increased the viscosity and has been solidified due to dryness in an ink flow path or on a nozzle surface in inkjet printers, the pigment inks are favorably dispersed and removed with the maintenance liquid of the invention.

Hereinafter, ingredients constituting the maintenance liquid of the invention will be described.

(Water-Soluble Organic Solvent)

The maintenance liquid of the invention contains at least one water-soluble organic solvent.

Specific examples of the water-soluble organic solvents that can be used in the invention include alcohols (e.g., methanol, ethanol, propanol, isopropanol, butanol, isobutanol, secondary butanol, tertiary butanol, pentanol, hexanol, cyclohexanol, and benzyl alcohol), polyhydric alcohols (e.g., ethylene glycol, diethylene glycol, triethylene glycol, polyethylene glycol, propylene glycol, dipropyrene glycol, polypropylene glycol, butylene glycol, hexanediol, pentane diol, glycerin, hexanetriol, and thiodiglycol), polyhydric alcohol ethers (e.g., ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, triethylene glycol dimethyl ether, dipropylene glycol monopropyl ether, and tripropylene glycol dimethyl ether), amines (e.g., ethanol amine, diethanolamine, triethanolamine, N-methyl diethanolamine, N-ethyl diethanolamine, morpholine, N-ethyl morpholine, ethylene diamine, diethylene diamine, triethylenetetramine, tetraethylenepentamine, polyethyleneimine, pentamethyldiethylenetriamine, and tetramethylpropylenediamine), amides (e.g., formamide, N,N-dimethyl formamide, and N,N-dimethyl acetamide), heterocyclics (e.g., 2-pyrrolidone, N-methyl-2-pyrrolidone, N-cyclohexyl-2-pyrrolidone, 2-oxazolidone, and 1,3-dimethyl-2-imidazolidinone), sulfoxides (e.g., dimethylsulfoxide), sulfones (e.g., sulfolane), sulfonates (e.g., sodium 1-butanesulfonate), acetonitrile, and acetone.

The water solubility as used herein refers to the fact that 5 g or more of the solvents dissolve in 100 g of water at 25° C.

Among the above, in terms of dissolution or re-dispersion and jetting properties of aqueous ink compositions that have increased the viscosity and have been solidified, the polyhydric alcohol ethers (preferably diethylene glycol monomethyl ether, diethylene glycol monoethyl ether, triethylene glycol monomethyl ether, and triethylene glycol monobutyl ether and more preferably diethylene glycol monomethyl ether and diethylene glycol monoethyl ether) and the polyhydric alcohols (preferably diethylene glycol, triethylene glycol, hexanediol, and glycerin and more preferably diethylene glycol and triethylene glycol) are preferable, and the polyhydric alcohol ethers are particularly preferable. The water-soluble solvents may be used singly or in combination.

The content of the water-soluble organic solvents contained in the maintenance liquid of the invention is preferably 0.1 to 50% by mass, more preferably 1 to 40% by mass, and particularly preferably 1 to 30% by mass % with respect to the total mass of the maintenance liquid in terms of dissolution or re-dispersion and jetting properties of substances that have increased the viscosity and have been solidified.

When the content of the water-soluble organic solvents is within the range of from 0.1% by mass to 50% by mass, a function of increasing washability of a nozzle member and an ink flow path member and a function of preventing corrosion thereof are sufficiently exhibited, and the initial state or a state close to the initial state of a recording head for the maintenance liquid and the jetting performance thereof are easily stably maintained over a long period of time.

(Water)

The maintenance liquid of the invention contains water. Preferable examples of water include pure water, such as ion exchanged water, ultra filtration water, reverse osmosis water, or distilled water, or ultrapure water, for the purpose of reducing ionic impurities as much as possible.

The maintenance liquid of the invention preferably has a composition mainly containing water in terms of safety, versatility, and ease of handling. The proportion of water in a composition mainly containing water as a solvent with respect to the total mass of the maintenance liquid is in the range of preferably 50 to 92% by mass and more preferably 75 to 92% by mass.

(Water-Soluble Silicate)

The water-soluble silicate to be used in the invention refers to alkali metal silicates represented by $$xM_2O \cdot ySiO_2.  \quad\quad\quad \text{Formula (1)}$$

In Formula (1), M represents K or Na, x represents 1 or 2, and y represents an integer of 1 to 5.

The alkali metal silicates represented by Formula (1) are referred to as meta-alkali metal silicates in the case of x being 1 and y being 1 and referred to as ortho-alkali metal salts in the case of x being 2 and y being 1, respectively, and both the meta-alkali metal silicates and ortho-alkali metal salts have water solubility.

In general, the alkali metal silicates are mixtures containing two or more compounds represented by Formula (1) in many cases. However, the alkali metal silicates to be used in the invention may be one compound represented by Formula (1) or may be a mixture containing two or more compounds represented by Formula (1).

In the invention, specific examples of the water-soluble silicates include alkali metal silicates, such as sodium silicate and potassium silicate.

The maintenance liquid of the invention prevents corrosion of nozzle members and ink supply path members when the water-soluble silicates are used. In addition, even when mixed with colorant-containing inks, the stability of the inks is not affected.

More specifically, when the maintenance liquid of the invention is used for washing a head, corrosion of nozzle members and ink supply path members is prevented and, even when mixed with ink in the nozzle member and the ink supply path, aggregation of the ink or nozzle clogging is not caused.

Among the water-soluble silicates mentioned above, sodium silicate is preferable from the viewpoint of preventing the corrosion of members to be used for inkjet recording devices and demonstrating favorable washability to aqueous inks containing colorants.

The water-soluble silicates of the maintenance liquid of the invention are not particularly limited. In order to maintain the effect of preventing the corrosion of nozzle members or ink supply path members and in order not to affect the performance of ink compositions, the total addition amount of the water-soluble silicates and colloidal silica described later is preferably 0.01 to 10% by mass, more preferably 0.01 to 5% by mass, and still more preferably 0.01 to 1.0% by mass with respect to a total amount of the maintenance liquid.

By adjusting the total addition amount in the range of 0.01 to 10% by mass, the effect of preventing the corrosion of nozzle members or ink supply path members can be maintained and the performance of ink compositions is not affected.

Furthermore, from the viewpoint of preventing corrosion of inkjet head nozzle members and ink flow path members and suppressing a reduction in liquid repellency, as well as ink washability, the maintenance liquid of the invention preferably contains at least one water-soluble silicate represented by Formula (1) in a proportion of 0.01 to 5% by mass with respect to the total amount of ink compositions. From the viewpoint of preventing corrosion of nozzle members or ink supply path members and jetting recovery properties and jetting stability after maintenance, the maintenance liquid of the invention preferably contains at least one member selected from sodium silicates and potassium silicates in a proportion of 0.01 to 1% by mass with respect to the total amount of ink compositions.

(Colloidal Silica)

The colloidal silica is preferably colloid containing particles of inorganic oxides containing silicon having an average particle size of 1 to 100 nm.

The colloidal silica may contain silica dioxide (including a hydrate thereof) as the main ingredients and aluminate as small-amount ingredients. Examples of the aluminate that is sometimes contained as small-amount ingredients include sodium aluminate and potassium aluminate.

The colloidal silica may further contain inorganic salts, such as sodium hydroxide, potassium hydrate, lithium hydroxide, and ammonium hydroxide or organic salts, such as tetra-methyl ammonium hydroxide. The inorganic salts and organic salts act, for example, as a stabilizer for colloid.

A dispersion medium of the colloidal silica is not particularly limited and may be any of water, organic solvents, and mixtures thereof. The organic solvents may be water-soluble organic solvents or water-insoluble organic solvents and are preferably water-soluble organic solvents. Specific examples include methanol, ethanol, isopropyl alcohol, and n-propanol.

Methods for producing the colloidal silica are not particularly limited, and the colloidal silica can be produced by generally-used methods. For example, the colloidal silica can be produced by aerosil synthesis by thermal decomposition of silicon tetrachloride or from water glass. Alternatively, the colloidal silica can also be produced by a liquid phase synthesis method, such as hydrolysis of alkoxide (e.g., "Fiber and Industry", Vol. 60, No. 7 (2004), P. 376).

The average particle size of particles contained in the colloidal silica in the invention is not particularly limited. For example, the average particle size thereof can be adjusted to 1 nm to 200 nm, and, as described above, is preferably 1 nm to 100 nm, more preferably 3 nm to 50 nm, still more preferably 3 nm to 25 nm, and particularly preferably 5 nm to 20 nm.

Based on the fact that the average particle size is 100 nm or lower, damages (e.g., degradation due to corrosion and a reduction in liquid repellency) caused by ink to members constituting an inkjet head, such as a base material, a protective film, or a liquid repellent film, can be more effectively suppressed. It can be considered that this results from the fact that the entire surface area of particles becomes large due to a small average particle size, and thus damages to members constituting an inkjet head can be more effectively suppressed, for example. Based on the fact that the average particle size is 1 nm or more, colloidal silica having increased productivity and little variation in the performance can be obtained.

In the invention, the average particle size of the colloidal silica is indicated by a volume average particle size. The volume average particle size can be determined with techniques, such as a light scattering method or a laser diffractometry, that are general measurement methods for dispersed particles.

In the invention, a value is employed that is obtained by diluting the maintenance liquid 10 times to 20 times with ion exchanged water, and measuring the average particle size using a particle size distribution meter (trade name: FPAR-1000, manufactured by Otsuka Electronics Co., Ltd.) while defining the refractive index of the ion exchanged water of a dispersion medium as 1.333.

The shape of the colloidal silica is not particularly limited insofar as the ink jetting performance is not impeded. For example, the shape may be any of a spherical shape, a long shape, a needle shape, and a bead shape. In particular, the spherical shape is preferable from the viewpoint of the ink jetting properties.

The colloidal silica that can be used for the invention may be one produced by the production method described above or may be a commercially-available colloidal silica. Specific examples of the commercially-available colloidal silica include LUDOX AM, LUDOX AS, LUDOX LS, LUDOX TM, and LUDOX HS (manufactured by E.I. Du Pont de Nemouvs & Co.); SNOWTEX S, SNOWTEX XS, SNOWTEX 20, SNOWTEX 30, SNOWTEX 40, SNOWTEX N, SNOWTEX C, and SNOWTEX O (manufactured by Nissan Chemical Industries, Ltd.); SYTON C-30 AND SYTON ZOO (manufactured by Mons anto Co.); NALCOAG-1060 and NALCOAG-IDs 21 to 64 (manufactured by Nalco Chem. Co.); METHANOL SOL, IPA SOL, MEK SOL, and TOLUENE SOL (manufactured by Fuso Chemical Co., Ltd.); CATALOID-S, CATALOID-F120, CATALOID SI-350, CATALOID SI-500, CATALOID SI-30, CATALOID S-20L, CATALOID S-20H, CATALOID S-30L, CATALOID S-30H, CATALOID SI-40, and OSCAL-1432 (isopropyl alcohol sol) (manufactured by JGC Catalysts and Chemicals Ltd.); and ADELITE (manufactured by ADEKA CORPORATION); and examples of bead-shaped colloidal silica include one marketed under trade names of SNOWTEX ST-UP, SNOWTEX PS-S, SNOWTEX PS-M, SNOWTEX ST-OUP, SNOWTEX PS-SO, and SNOWTEX PS-MO (manufactured by Nissan Chemical Industries, Ltd.). The commercially-available colloidal silica can be easily obtained.

The pH of many of the commercially-available colloidal silica dispersion liquids is adjusted to an acidic pH or an alkaline pH. This is because a stable dispersion region of the colloidal silica exists in the acidic or alkaline side. When the commercially-available colloidal silica dispersion is added to the maintenance liquid during preparation, the commercially-available colloidal silica dispersion needs to be added considering the pH of the stable dispersion region of the colloidal silica and the pH of the maintenance liquid during preparation.

The content of the colloidal silica in the maintenance liquid of the invention is not particularly limited.

Preferably, the colloidal silica is used in the amount of 0.01 to 10% by mass indicated in the section of the water-soluble silicate.

In the invention, only the colloidal silica may be used without using the water-soluble silicate, only the water-soluble silicate may be used without using the colloidal silica, or both the water-soluble silicate and the colloidal silica may be used.

When both the water-soluble silicate and the colloidal silica are used, a preferable combination of the mass of each of the water-soluble silicate and the colloidal silica is 1:9 to 9:1.

By adjusting the total content of the water-soluble silicate and the colloidal silica in the maintenance liquid is adjusted in the range of 0.01 to 10% by mass, there arises a tendency such that the effect of preventing the corrosion of nozzle members or ink supply path members can be maintained and the performance of ink compositions is not affected. Thus, such a content range is preferable.

Adjusting the content of the water-soluble organic solvent in the maintenance liquid and the total content of the water-soluble silicate and the colloidal silica in the maintenance liquid in the range above is preferable since there arises a tendency such that the effect of preventing the corrosion of nozzle members or ink supply path members can be maintained and the performance of ink compositions is not affected.

(Surfactant)

The maintenance liquid of the invention preferably contains at least one surfactant.

As surfactants that can be contained in the maintenance liquid of the invention, anionic surfactants or nonionic surfactants are preferably used from the viewpoint of not causing an aggregation reaction with ink.

Specific examples of the anionic surfactants include sodium oleic acid methyl taurate, sodium dodecyl sulfate, sodium dodecylbenzenesulfonate, sodium lauryl sulfate, sodium alkyl diphenyl ether disulfonate, sodium alkyl naphthalene sulfonate, sodium dialkyl sulfosuccinate, sodium stearate, potassium oleate, sodium dioctyl sulfosuccinate, sodium polyoxyethylene alkyl ether sulfate, sodium polyoxyethylene alkyl ether sulfate, sodium polyoxyethylene alkyl phenyl ether sulfate, sodium dialkyl sulfosuccinate, sodium stearate, sodium oleate, and sodium t-octyl phenoxy ethoxy polyethoxy ethyl sulfate. At least one of them may be selected.

Specific examples of the nonionic surfactants include acetylene diol derivatives, such as an ethylene oxide adduct of acetylene diol; acetylene alcohol surfactants; ether surfactants, such as polyoxyethylene dodecyl phenyl ether, polyoxyethylene alkyl allyl ether, polyoxyethylene oleyl ether, polyoxyethylene lauryl ether, polyoxyethylene octyl phenyl ether, polyoxyethylene oleyl phenyl ether, polyoxyethylene nonyl phenyl ether, polyoxyethylene alkyl ether, and polyoxyalkylene alkyl ether; ester surfactants, such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; silicone surfactants, such as dimethyl polysiloxane; fluorine containing surfactants, such as fluoroalkylester or perfluoroalkyl carboxylate, an oxyethylene.oxypropylene block copolymer, t-octyl phenoxy ethyl polyethoxy ethanol, and nonyl phenoxy ethyl polyethoxy ethanol. At least one of them may be selected.

Among the above, the surfactants are preferably the nonionic surfactants, more preferably acetylene diol derivatives (acetylene diol surfactants), such as an ethylene oxide adduct of acetylene diol or acetylene alcohol surfactants in terms of less foaming and excellent defoaming performance, and, in this case, particularly preferably acetylene diol derivatives (acetylene diol surfactants), such as an ethylene oxide adduct of acetylene diol.

Further specific examples of the acetylene glycol surfactants and the acetylene alcohol surfactants include 2,4,7,9-tetramethyl-5-decyne-4,7-diol, 3,6-dimethyl-4-octyne-3,6-diol, and 3,5-dimethyl-1-hexyne-3-ol. Examples include commercially-available surfactants, such as SURFINOLs 104, 82, 465, 485, and TG (trade name) manufactured by Air Products, and OLFINE STG and OLFINE E1010 (trade name) manufactured by Nisshin Chemical Co., Ltd.

The content of the surfactants in the maintenance liquid of the invention is not particularly limited, and is preferably 0.1% by mass or more and more preferably 0.5 to 10% by mass from the viewpoint of washability.

In the maintenance liquid of the invention, the amount of a moisturizer is preferably smaller in terms of preventing curling of a recording medium after recording due to mixture of the moisturizer during maintenance. The content of the moisturizer is preferably 1% by mass or lower with respect to the total mass of the maintenance liquid, and, particularly preferably, the moisturizer is not contained.

The moisturizer refers to water-soluble compounds having low volatility and relatively high water retention ability. Specific examples include polyols (examples: glycerin, ethylene glycol, diethylene glycol, triethylene glycol, tetraethylene glycol, polyethylene glycol, propylene glycol, dipropyrene glycol, polypropylene glycol, 1,3-propane diol, 1,4-butanediol, 1,5-pentane diol, and pentaerythritol), lactams (examples: 2-pyrrolidone and N-methyl-2-pyrrolidone), and water-soluble solid moisturizers (examples: nitrogen compounds, such as urea, thiourea, or N-ethyl urea; diols, such as 1,6-hexanediol, 1,8-octanediol, 2,2-dimethyl-1,3-propanediol, and 2,2-diethyl-1,3-propane diol; trimethylolethane, trimethylolpropane; monosaccharides, disaccharides, oligosaccharides, and polysaccharides, such as glucose, mannose, fructose, ribose, xylose, arabinose, galactose, aldonic acid, glucitol (sorbitol), maltose, cellobiose, lactose, sucrose, trehalose, and maltotriose, and derivatives of the saccharides, such as reducing sugar, oxidization sugar, amino acid, and thiosugar).

—Physical Property Value and the Like of Maintenance Liquid—

The maintenance liquid of the invention is preferably a liquid that does not aggregate when mixed with an aqueous ink composition. This is because when aggregation occurs, ingredients, such as pigments, in the ink composition further adhere to an inkjet head or the like, which reduces the effects of the invention.

The pH of the maintenance liquid of the invention is not particularly limited, and the pH value at 25° C. is in the range of preferably from 7 to 12 and more preferably 7 to 10 from the viewpoint of preventing aggregation of colorants contained in the ink composition and washability.

In order to adjust the pH of the maintenance liquid in the range above, pH adjusters, such as water-soluble basic substances, can be used as required.

Specific examples of the water-soluble basic substances include alcohol amines (e.g., diethanolamine, triethanolamine, and 2-amino-2-ethyl-1,3-propane diol), alkali metal hydroxides (e.g., lithium hydroxide, sodium hydroxide, and potassium hydrate), ammonium hydroxides (e.g., ammonium hydroxide and quaternary ammonium hydroxide), phosphonium hydroxides, and alkaline metal carbonates.

The maintenance liquid of the invention preferably contains antiseptics and antifungal agents. Examples of the antiseptics and the antifungal agents include sodium benzoate, sodium pentachlorophenol, sodium 2-pyridinethiol-1-oxide, sodium sorbitanate, sodium dehydroacetate, or 1,2-benzoisothiazoline-3-on (PROXEL BZ, PROXEL $BD_2O$, PROXEL GXL, PROXEL XL2, or PROXEL TN manufactured by Arch Chemicals Inc.).

The viscosity at 25° C. of the maintenance liquid of the invention is preferably from 1 mPa·s to 1000 mPa·s, more preferably 1 mPa·s to less than 500 mPa·s, and still more preferably from 2 mPa·s to less than 100 mPa·s from the viewpoint of workability. The viscosity is a value measured under 25° C. conditions using a VISCOMETER TV-22 (trade name, manufactured by TOKI SANGYO CO. LTD).

The maintenance liquid in the invention may be colored by blending colorants, such as pigments. In terms of avoiding a possibility of deteriorating the hue of ink (i.e., ink images), the content of the colorants, such as pigments, is preferably 1% by mass or lower with respect to the total mass of the maintenance liquid. Particularly preferably, the maintenance liquid is a colorless liquid not containing colorants.

The maintenance liquid of the invention is preferably applied to inkjet recording devices using pigment ink as an image formation ink to be used for maintenance of a jetting nozzle for jetting the pigment ink of an inkjet recording device having the jetting nozzle. As described above, the maintenance liquid of the invention has exellent washability, and thus is suitably used in inkjet recording devices using a pigment ink that have been increasingly utilized in recent years.

The maintenance liquid of the invention is preferably used in combination with aqueous ink compositions containing colorants.

An ink set of the invention is constituted by providing aqueous ink compositions containing colorants and the maintenance liquid of the invention previously described above. Since the maintenance liquid previously described above is excellent in washability of ink, the ink set of the invention can fix and maintain an inkjet head that jets ink and the jetting performance and hold and maintain the initial state or a state close to the initial state particularly in image formation using a pigment ink having a problem in the washability.

Here, the aqueous ink composition (hereinafter sometimes merely referred to as "ink") will be described.

Since the aqueous ink composition in the invention demonstrates remarkable effects when the aqueous ink composition is a pigment ink containing a pigment as a colorant. Thus, the aqueous ink composition is preferably a pigment ink.

The aqueous ink composition generally contains water with a pigment and preferably further contains a resin compound and a pigment dispersant from the viewpoint of excellent jetting properties and fixability of images to be formed.

The aqueous ink composition in the invention is preferably a pigment ink in which a pigment is dispersed using the pigment dispersant. The pigment ink may be constituted further using other ingredients, such as organic solvents or surfactants, as required in addition to the pigment, water, resin compound, and pigment dispersant.

Hereinafter, the aqueous ink composition will be described with reference to the pigment ink.

<Colorant>

The pigment ink as the aqueous ink composition contains at least one pigment as a colorant. The pigment to be contained in the ink is not particularly limited, and can be selected as appropriate according to the purpose. The pigment may be any of organic pigments and inorganic pigments. The ink may contain, in addition to the pigment, other colorants, such as dyes, for adjusting the hue.

Examples of the organic pigments include azo pigments, polycyclic pigments, dye chelates, nitro pigments, nitroso pigments, and aniline black. Among the above, the azo pigments, the polycyclic pigments, and the like are more preferable. Examples of the azo pigments include azo rake, insoluble azo pigments, condensation azo pigments, and chelate azo pigments. Examples of the polycyclic pigments include phthalocyanine pigments, perylene pigments, perynone pigments, anthraquinone pigment, quinacridone pigments, dioxazine pigments, indigo pigments, thioindigo pigments, isoindolinone pigments, and quinophthalone pigments. Examples of the dye chelates include a basic dye type chelate and an acid dye type chelate.

Examples of the inorganic pigments include titanium oxide, iron oxide, calcium carbonate, barium sulfate, aluminum hydroxide, barium yellow, cadmium red, chrome yellow, and carbon black. Among the above, carbon black is particularly preferable.

Examples of the carbon black include one produced by known methods, such as a contacting method, a furnace method, and a thermal method. When the pigment is used as the colorant, it is preferable to use a dispersant together with the pigment from the viewpoint of dispersion stability in ink or to use a surface treatment pigment as the pigment.

The colorants may be used singly or may be used in combination of a plurality of different types of the colorants selected from those in the same group mentioned above or between the groups mentioned above.

In the aqueous ink composition in the invention, the content of the colorant in the total mass of ink is preferably from 0.1% by mass to 15% by mass, more preferably from 0.5% by mass to 12% by mass, and particularly preferably from 1% by mass to 10% by mass in terms of an effect of improving the washability. The pigment may be used singly or in combination of two or more thereof.

<Pigment Dispersant>

The aqueous ink composition in the invention preferably contains the pigment while being dispersed with the pigment dispersant by using at least one pigment dispersant. Thus, pigment particles can be made to be present with a fine particle size, and thus high dispersion stability is obtained after dispersion. In the invention, when the aqueous ink composition contains a resin dispersant, the washing effect by the maintenance liquid is likely to decrease with an increase in the viscosity of ink, solidification of ink, and the like. Thus, the effects of the invention are much demonstrated in the case where an ink containing the pigment dispersant is used.

With respect to the pigment, the entire surface of the particles is not necessarily covered and at least a part of the particle surface may be covered depending on the case.

The resin dispersant (hereinafter sometimes merely referred to as a dispersant) of the pigment may be any of polymer dispersants or low-molecular weight surfactant type dispersants. The polymer dispersants may be any of water-soluble dispersants or water-insoluble dispersants.

The low-molecular weight surfactant type dispersants can stably disperse pigments in water solvents while maintaining ink at a low viscosity. The low molecular weight surfactant type dispersants are low molecular weight dispersants having a molecular weight of 2,000 or lower. The molecular weight of the low molecular weight surfactant type dispersants is preferably 100 to 2,000 and more preferably 200 to 2,000.

The low molecular weight surfactant type dispersants has a structure of containing a hydrophilic group and a hydrophobic group. One or more of each of the hydrophilic group and the hydrophobic group may be independently contained in a single molecule and a plurality of kinds of hydrophilic groups and hydrophobic groups may be contained. The low molecular weight surfactant type dispersants can also have, as appropriate, a linking group for linking the hydrophilic group and the hydrophobic group.

The hydrophilic group is an anionic type, a cationic type, a nonionic type, a betaine type in which the types are combined, or the like.

The anionic group may be any group insofar as the group has a negative charge, and is preferably a phosphoric acid group, a phosphonic acid group, a phosphinic acid group, a sulfuric acid group, a sulfonic acid group, a sulfinic acid group, or a carboxylic acid group, more preferably a phosphoric acid group or a carboxylic acid group, and still more preferably a carboxylic acid group. The cationic group may be any group insofar as the group has a positive charge, and is preferably an organic cationic substituent group and more preferably a cationic group of nitrogen or phosphorous. The cationic group is still more preferably a pyrridium cation or an ammonium cation. Examples of the nonionic group include polyethylene oxide, polyglycerine, and a portion of a sugar unit.

The hydrophilic group is preferably an anionic group.

When the low molecular weight surfactant type dispersant has an anionic hydrophilic group, the pKa is preferably 3 or higher from the viewpoint of accelerating an aggregating reaction by contacting an acidic treatment liquid. The pKa of the low molecular weight surfactant type dispersant is a value experimentally determined from a titration curve obtained by titration of a liquid obtained by dissolving 1 mmol/L of the low molecular weight surfactant type dispersant in a tetrahydrofuran-water solution (3:2 by V/V) with an aqueous acidic or alkaline solution. Theoretically, when the pKa value of the low molecular weight surfactant type dispersant is 3 or higher, 50% or more of the anionic group is rendered in a non-dissociated state upon contact with a liquid having a pH of about 3. Consequently, the water solubility of the low molecular weight surfactant type dispersant markedly decreases and an aggregating reaction occurs. In other words, the aggregation reactivity increases. From such a viewpoint, the low molecular weight surfactant type dispersant preferably has a carboxylic acid group as the anionic group.

The hydrophobic group has a structure of a hydrocarbon type, a fluorocarbon type, a silicone type, or the like, and the hydrocarbon type is particularly preferable. The hydrophobic group may be any of a straight chain structure or a branched structure. The hydrophobic group may be one straight chain structure or a greater number of straight chain structures. When the hydrophobic group has two or more straight chain structures, a plurality of different types of hydrophobic groups may be contained.

The hydrophobic group is preferably a hydrocarbon group having 2 to 24 carbon atoms, more preferably a hydrocarbon group having 4 to 24 carbon atoms, and still more desirably a hydrocarbon group having 6 to 20 carbon atoms.

Among the polymer dispersants, examples of the water-soluble dispersant include hydrophilic polymer compounds. Examples of natural hydrophilic polymer compounds include plant-based polymers, such as gum arabic, gum tragacanth, gua gum, karaya gum, locust bean gum, arabinogalacton, pectin, or quince seed starch; seaweed-based polymers, such as alginic acid, carrageenan, or agar; animal-based polymers, such as gelatin, casein, albumin, or collagen; and microorganism-based polymers, such as xanthane gum or dextran.

Examples of hydrophilic polymer compounds that have been modified from natural raw materials include fiber-based polymers, such as methyl cellulose, ethyl cellulose, hydroxyethyl cellulose, hydroxpropyl cellulose, or carboxymethyl cellulose; starch-based polymers, such as sodium starch glycolate or sodium starch phosphate ester; and seaweed-based polymers, such as sodium alginate or propyleneglycol alginate ester.

Examples of synthetic hydrophilic polymer compounds include vinyl-based polymers, such as polyvinyl alcohol, polyvinyl pyrrolidone, or polyvinyl methyl ether; acrylic resins, such as non-crosslinked polyacrylamide, polyacrylic acid or an alkali metal salt thereof, and water-soluble styrene-acryl resin; water-soluble styrene maleic acid resin, water-soluble vinyl naphthalene acryl resin, water-soluble vinyl naphthalene maleic acid resin, polyvinyl pyrrolidone, polyvinyl alcohol, an alkali metal salt of a β-naphthalene sulfonic acid formaldehyde condensate, a polymer compound with side chains having cationic functional groups, such as quaternary ammonium or an amino group, and natural polymer compounds, such as shellac.

Among the above, water soluble dispersants into which a carboxyl group has been incorporated, such as a homopolymer of acrylic acid, methacrylic acid, or styrene acrylic acid or a copolymer of monomer having another hydrophilic group, are preferable as the hydrophilic polymer compounds.

Among the polymer dispersants, as water-insoluble dispersants, polymers having both a hydrophobic moiety and a hydrophilic moiety can be used. Examples include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a vinyl acetate-maleic acid copolymer, and a styrene-maleic acid copolymer.

The average molecular weight of the polymer dispersant is preferably 3,000 to 100,000, more preferably 5,000 to 50,000, still more preferably 5,000 to 40,000, and particularly preferably 10,000 to 40,000.

The acid value of the polymer dispersant is preferably 100 mgKOH/g or lower from the viewpoint that the aggregation properties when a treating liquid contacts is favorable. The acid value is more preferably 25 to 100 mgKOH/g, still more preferably 25 to 80, and particularly preferably 30 to 65. When the acid value of the polymer dispersant is 25 or more, the stability of the self-dispersibility becomes excellent.

The polymer dispersant preferably contains a polymer having a carboxyl group from the viewpoint of the self-dispersibility and an aggregation rate when a treating liquid contacts and more preferably contains a polymer having a carboxyl group and an acid value of 25 to 80 mgKOH/g.

The mixture mass ratio (p:s) of the organic pigment (p) to the dispersant (s) is preferably in the range of 1:0.06 to 1:3, more preferably in the range of 1:0.125 to 1:2, and still more preferably 1:0.125 to 1:1.5.

In the invention, it is preferable to contain a pigment and a dispersant from the viewpoint of the lightfastness, quality, and the like of images, it is more preferably to contain an organic pigment and a polymer dispersant, and it is particularly preferably to contain an organic pigment and a polymer dispersant containing a carboxyl group. Further, the pigment is preferably a water-insoluble pigment which is covered with a polymer dispersant having a carboxylic group from the viewpoint of aggregation property.

The average particle size of the pigment is preferably 10 nm to 200 nm, more preferably 10 nm to 150 nm, and still more preferably 10 nm to 100 nm. When the average particle size is 200 nm or lower, the color reproduction properties become excellent and the droplet jetting properties when droplets are jetted by an inkjet method become excellent. When the average particle size is 10 nm or more, the lightfastness becomes excellent. The particle size distribution of the colorant is not particularly limited and may be a broad particle size distribution or a monodisperse particle size distribution. Moreover, a mixture of two or more kinds of colorants having a monodisperse particle size distribution may be mixed for use.

The average particle size and the particle size distribution of polymer particles are determined by measuring the volume average particle size by a dynamic light scattering method using a nanotrack particle size analyzer UPA-EX150 (trade name, manufactured by Nikkiso Co., Ltd.).

—Ratio of Pigment to Pigment Dispersant—

The ratio of the pigment to the pigment dispersant is preferably 100:25 to 100:140 and more preferably 100:25 to 100:50 in terms of a mass ratio. When the ratio of the pigment to the pigment dispersant is 100:25 or more, the dispersion stability and the scratch resistance tend to become excellent and when the ratio is 100:140 or lower, the dispersion stability tends to improve.

<Resin Particles>

The ink composition of the invention can contain at least one type of resin particles. By blending resin particles, the ink fixability can be increased.

Examples of resin particles or polymeric latex that can be used for the invention include acrylic resin, vinyl acetate resin, styrene-butadiene resin, vinyl chloride resin, acryl-styrene resin, butadiene resin, styrene resin, crosslinked acryl resin, crosslinked styrene resin, benzoguanamine resin, phenol resin, silicone resin, epoxy resin, urethane resin, paraffine resin, and fluororesin. Preferable examples include acryl resin, acryl-styrene resin, styrene resin, crosslinked acryl resin, and crosslinked styrene resin.

The weight average molecular weight of the resin particles is preferably from 10,000 to 200,000 and more preferably from 100,000 to 200,000.

The average particle size of the resin particles is preferably in the range of 10 nm to 1 μm, more preferably in the range of 10 nm to 200 nm, still more preferably in the range of 20 nm to 100 nm, and particularly preferably in the range of 20 nm to 50 nm.

The glass transition temperature Tg of the resin particles is preferably 30° C. or higher, more preferably 40° C. or higher, and still more preferably 50° C. or higher.

The addition amount of the resin particles is preferable 0.5 to 20% by mass, more preferably 3 to 20% by mass, and still more preferably 5 to 15% by mass with respect to the ink composition.

The particle size distribution of polymer particles is not particularly limited. The polymer particles may have a broad particle size distribution or a monodisperse particle size distribution. Two or more kinds of polymer particles having a monodisperse particle size distribution may be mixed for use.

<Water>

The aqueous ink composition in the invention can be constituted using water. The amount of water is not particularly limited and is preferably from 10% by mass to 99% by mass in terms of securing stability and jetting reliability.

<Other Ingredients>

The aqueous ink composition in the invention can contain other ingredients, as required, in addition to the ingredients described above. Examples of the other ingredients include known additives, such as surfactants, UV absorbers, fading inhibitors, antifungal agents, pH adjusters, antirusts, antioxidants, emulsion stabilizers, antiseptics, antifoaming agents, viscosity adjusters, dispersion stabilizers, and chelating agents.

The pH of the aqueous ink composition in the invention is not particularly limited. From the viewpoint of preventing aggregation of the colorant contained in the ink composition and washability, the pH value at 25° C. is preferably in the range of from 6.5 to 12 and more preferably in the range of 7 to 10.

In order to adjust the pH of the water-soluble ink composition in the above range, pH adjusters, such as the water-soluble basic substances described above, can be used as required.

The ink set of the invention contains the aqueous ink composition containing the colorant and the maintenance liquid of the invention. The aqueous ink composition and the maintenance liquid are the same as those described in the sections therefor, and preferable examples are also the same as above.

The maintenance liquid and the ink set for inkjet formation of the invention are used for inkjet recording. Specifically, the maintenance liquid and the ink set of the invention are used for the case where energy is applied to an inkjet recording ink to record images on known image receiving materials (e.g., regular paper, resin coated paper, paper for exclusive use with inkjet, film, paper for common use in electrophotography, cloth, glass, metal, and ceramics).

The inkjet system is not particularly limited and may be of any known system, such as, a charge control system of jetting ink utilizing electrostatic attraction force, a drop on demand system of utilizing a vibration pressure of a piezo element (pressure pulse system), an acoustic inkjet system of converting electric signals into acoustic beams, irradiating the ink with the acoustic beams, and jetting the ink utilizing a radiation pressure, and a thermal inkjet system of heating ink to form bubbles and utilizing a generated pressure (BUBBLEJET (Registered Trademark). The inkjet head may be either an on-demand system or a continuous system. Examples of a jetting system include an electric-mechanical conversion system (e.g., a single cavity type, a double cavity type, a bender type, a piston type, a share mode type, and a shared wall type), an electric-heat conversion system (e.g., thermal inkjet type, BUBBLEJET (Registered Trademark)), an electrostatic suction system (e.g., an electric field control type and a slit jet type), and a discharging system (e.g., a spark jet type).

Ink nozzles and the like for jetting ink when recording by the inkjet system are not particularly limited and can be selected as appropriate in accordance with the purpose.

Examples of the ink-jet system include a shuttle system in which a short serial head is used and recording is performed while allowing a head to scan in the width direction of a recording medium and a line system employing a line head in which recording elements are arranged corresponding to the entire region of one side of a recording medium. In the line system, images can be recorded over the entire surface of the recording medium by allowing the recording medium to scan in the direction orthogonal to the arrangement direction of the recording elements, in which a transportation system, such as a carriage, by which the short head scans, is not necessary. Since complicated scanning control for the movement of the carriage and the recording medium becomes unnecessary and only the recording medium moves, a higher recording rate can be achieved as compared with the shuttle system. The invention is applicable to any of the systems.

A maintenance method of the invention includes washing, using the maintenance liquid of the invention previously described above, at least one portion of an inkjet recording head for jetting an aqueous ink composition at least containing a colorant to form images. The maintain maintenance liquid previously described above is easily dissolved or re-dispersed even in a viscosity-increased state or a solidified state after recording and, due to high ink washing and removing properties, can hold and maintain the initial state or a state close to the initial state of the jetting performance of the inkjet recording head for jetting ink. This is effective particularly in an aspect in which images are recorded using an aqueous ink composition containing water, a pigment dispersed with a pigment dispersant, and a resin compound.

Any maintenance method may be selected as the maintenance method using the maintenance liquid of the invention, insofar as the method includes supplying a maintenance liquid to a desired portion, and removing an adhered ink while being solidified or the like from the viewpoint of preventing dirt, clogging, and the like due to the adhered ink. For example, the maintenance can be performed by a method including supplying the maintenance liquid to the nozzle surface of a recording head of an inkjet recording device, and wiping the nozzle surface.

In the method, the maintenance liquid can be supplied by, for example, roller coating or spraying. In the process for removing the solidified ink (ink solidified substances), a method including rubbing (wiping) the nozzle surface using a wiper blade after the maintenance liquid is supplied to scratch off the ink solidified substance, a method for removing the same by a wind pressure or a liquid pressure of the maintenance liquid or the like, and a method for wiping off the same with a cloth or papers are preferable. In particular, scratching off with a blade or wiping off with a cloth or papers is preferable. The amount, temperature, and the like of the maintenance liquid during supplying can be selected as appropriate depending on the case, such as a liquid composition, an ink type, the adhesion amount, and the like.

In the inkjet recording system, since ink is jetted from a nozzle having a diameter as minute as about 20 to 50 μm, an increase in the viscosity of the ink and the generation of deposits are likely to occur in the vicinity of the nozzle tip due to volatilization of low-boiling-point solvents or water, separation, aggregation, or the like of the colorant, which sometimes causes defects, such as printing disorder, nozzle clogging, and the like. The defects are likely to occur during prolonged suspension of devices. The maintenance liquid of the invention has excellent ink washability, and can overcome the defects, such as printing disorder, nozzle clogging, and the like.

The maintenance liquid of the invention can be preferably used for washing before suspension after prolonged use or washing before operating after prolonged suspension as a method for overcoming defects, such as an increase in the viscosity or solidification due to dryness of ink.

—Inkjet Head—

In an image forming method, the inkjet head preferably at least has a nozzle plate. FIG. 1 is a schematic cross sectional view illustrating an example of the internal structure of an inkjet head.

As shown in FIG. 1, an inkjet head 200 has a nozzle plate 11 having a jetting opening (nozzle) and an ink supply unit 20 provided at the side opposite to the jetting direction of the nozzle plate. The nozzle plate 11 has a plurality of jetting openings 12 for jetting ink. In FIG. 1, the inkjet head 200 is further equipped with a pressure chamber 21, a nozzle connecting path 22, an ink supply flow path 23, a supply controlling path 24, a common liquid chamber 25, a piezo element 30 (piezoelectric actuator or pressure generating unit), a vibration plate 31, an adhesive layer 32, a lower electrode 33, a piezoelectric body layer 34, an upper electrode 35, a circulation squeezing member 41 and a circulation path 42.

Figure 2:
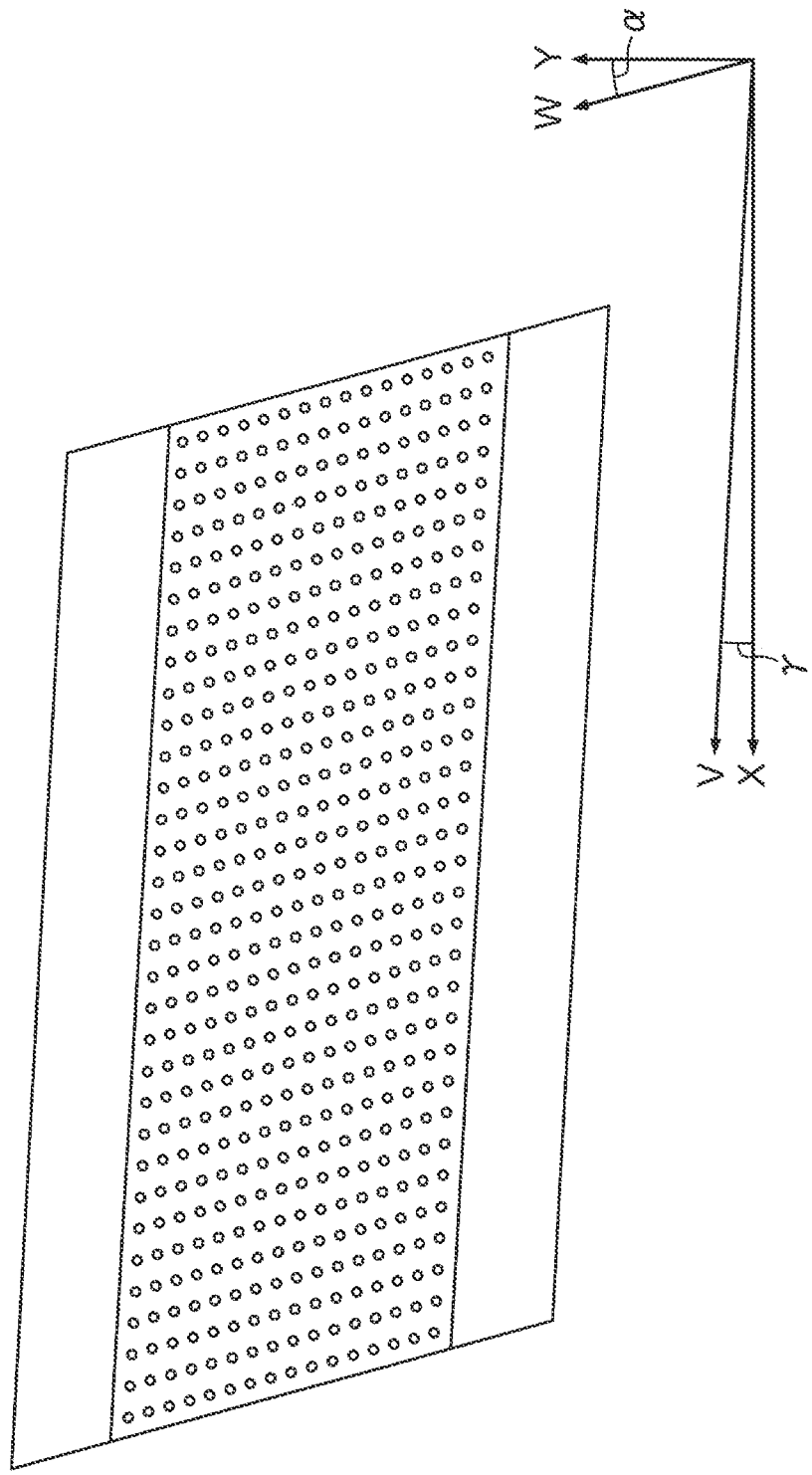
FIG. 2 is a schematic view showing an example of the arrangement of jetting openings of a nozzle plate.

In the nozzle plate 11, jetting openings (nozzles) of 32×60 are two-dimensionally arranged as shown in FIG. 2. The nozzle plate is formed with silicon and has a structure such that the silicon is exposed to the inside of the nozzle opening and to the surface of the side in the ink jetting direction, for example.

The nozzle plate allows high-definition 1200 dpi and high-quality recording with a high-speed single path (one passage of a recording medium). More specifically, the plurality of nozzles of the nozzle plate are arranged in a two-dimensional matrix manner, and the ink supply unit fixed to the nozzle plate has a flow path structure with which a large amount of ink can be jetted at a high frequency (i.e., jetting at a high Duty).

(Water-Repellent Treatment of InkJet Head Nozzle)

In the recording head, the nozzle surface is preferably subjected to water-repellent treatment described in JP-A No. 2002-292878 in terms of an improvement of jetting stability and washability. For example, a fluororesin member, a single-layered fluororesin plate, a member (plate) having a plurality of layers of two or more layers in which a fluororesin layer is formed on the outermost surface of a base material, or the like can be utilized.

Examples of materials of the fluororesin member or the fluororesin layer include various known fluororesins, such as a fluorocarbon resin containing —$CF_2$— in the main chain and —$CF_3$ as the terminal group, a fluorosilicone resin containing —$SiF_2$— in the main chain and —$SiF_3$ as the terminal group, or a hydrofluorocarbon resin and a hydrofluorosilicone resin in which the fluorine atoms of the fluorocarbon resin and the fluorosilicone resin are partially replaced with hydrogen atoms.

More specific examples of the materials of the fluororesin member or the fluororesin layer include fluororesins, such as PTFE (polytetrafluoroethylene), PFA (tetrafluoroethylene perfluoro alkyl vinyl ether copolymer), FEP (tetrafluoroethylene hexafluoro propylene copolymer), and ETFE (tetrafluoroethylene copolymer). Among the above, PTFE can be mentioned as a particularly preferable example.

In the invention, the water repellency refers to the property of a surface having a contact angle larger than the contact angle with water of the surface of generally-known bulk materials. More specifically, the material having the largest contact angle among bulk materials is a PFA resin and the contact angle thereof is about 115°. Accordingly, the property of the surface having a contact angle larger than the contact angle is referred to as super-water repellency. Thus, in the invention, super-water repellency imparting treatment for the surface of the fluororesin member or the fluororesin layer refers to treatment for imparting higher water repellency than the intrinsic water repellency of the fluororesin, i.e., surface treatment for treating the surface of the fluororesin so as to have a contact angle larger than the intrinsic contact angle of the fluororesin. Thus, in the invention, the contact angle with water is preferably 120° or more and may be 150° or more or 170° or more. The upper limit of the contact angle is not particularly limited.

Here, the super-water repellency imparting treatment for the surface of the fluororesin member or the fluororesin layer to be used in the invention is not particularly limited and may be any treatment insofar as super-water repellency can be imparted to the surface of the fluororesin. For example, the methods described in detail in "MOLDED FLUORORESIN OBJECT HAVING MODIFIED SURFACE LAYER, SURFACE TREATMENT OF FLUORORESIN, AND APPARATUS THEREFOR" (JP-A No. 2000-17091), "Influence of Ar ion Implantation on Super-Water Repellency of Fluorocarbon Resins" (Preprints of 15th Symposium on Ion Implantation Surface Treatment), and the like may be used. Hydrophilicity imparting treatment to be used for the invention is not particularly limited and may be any treatment insofar as hydrophilicity can be imparted to the surface of fluororesin. For example, the methods described in detail in "Latest Advances in Surface Modification of Fluororesins", Nitto Giho, Vol. 34, May, 1996" and the like may be used.

—Recording Medium—

Image forming methods are methods for forming images on recording media.

The recording media are not particularly limited and general printing paper containing cellulose as the main ingredients, such as a so-called top-quality paper, coated paper, or art paper, which is used for general offset printing and the like, can be used.

As the recording media, generally marketed recording media can be used. Examples include high-quality paper (A), such as "OK PRINCE High Quality" (trade name) manufactured by Oji Paper Co., Ltd., "SHIORAI" (trade name) manufactured by Nippon Paper Group, and "NEW NPI High Quality" (trade name) manufactured by Nippon Paper Group Inc.; fine coated paper, such as "OK EVER LIGHT COAT" (trade name) manufactured by Oji Paper Co., Ltd., and "AURORA S" (trade name) manufactured by Nippon Paper Group; lightweight coated paper (A3), such as "OK COAT L" (trade name) manufactured by Oji Paper Co., Ltd., and "AURORA L" (trade name) manufactured by Nippon Paper Group; coated paper (A2, B2), such as "OK TOP COAT+" (trade name) manufactured by Oji Paper Co., Ltd. and "AURORA COAT" (trade name) manufactured by Nippon Paper Group; and art paper (A1), such as "OK KANEFUJI+" (trade name) manufactured by Oji Paper Co., Ltd., and "TOKUBISHI ART" (trade name) manufactured by Mitsubishi Paper Mills Ltd. Various kinds of photographic paper for use in inkjet recording can also be used.

Hereinafter, exemplary aspects of the invention will be mentioned.

<1> A maintenance liquid, including water, a water-soluble organic solvent, and at least one of a water-soluble silicate represented by Formula (1) or colloidal silica:

$$xM_2O \cdot ySiO_2 \qquad \text{Formula (1):}$$

wherein, in Formula (1), M represents K or Na, x represents 1 or 2, and y represents an integer of 1 to 5.

<2> The maintenance liquid according to <1> above, in which the pH value at 25° C. is from 6.5 to 12.

<3> The maintenance liquid according to <1> or <2> above, in which the average particle size of the colloidal silica is from 1 to 100 nm.

<4> The maintenance liquid according to any one of <1> to <3> above, in which the total content of the water-soluble silicate and the colloidal silica is from 0.01 to 10% by mass with respect to a total amount of the maintenance liquid.

<5> The maintenance liquid according to any one of <1> to <4> above, in which the content of the water-soluble organic solvent is from 0.1 to 50% by mass with respect to a total amount of the maintenance liquid.

<6> The maintenance liquid according to any one of <1> to <5> above, further contains an acetylene diol surfactant.

<7> An ink set, contains an aqueous ink composition including a colorant and the maintenance liquid according to any one of <1> to <6> above.

<8> The ink set according to <7> above, in which the colorant is a resin-coated pigment.

<9> The ink set according to <7> or <8> above, in which the pH value at 25° C. of the aqueous ink composition is from 6.5 to 12.

<10> A maintenance method, including washing, with the maintenance liquid according to any one of <1> to <6> above, at least a part of an inkjet recording head that discharges an aqueous ink composition including a colorant to form an image.

<11> The maintenance method according to <10> above, in which the colorant is a resin-coated pigment.

EXAMPLES

The present invention will be more specifically described with reference to Examples. The range of the invention is not limited to the specific examples shown below. Unless otherwise specified, "part(s)" and "%" are based on mass.

(Preparation of Maintenance Liquid)

The ingredients shown in Table 1 were mixed, sufficiently stirred and dissolved, and filtered under pressure through a micro filter having a pore size of 0.2 μm (manufactured by Fuji Photo Film Co., Ltd.), thereby preparing a maintenance liquid. The pH was adjusted by adding sodium hydrogen carbonate or acetic acid.

The average particle size of colloidal silica contained in the maintenance liquid was measured using FPAR-1000 (trade name) manufactured by Otsuka Electronics Co., Ltd., after diluting with ion exchanged water. In this case, the measurement was performed by inputting the refractive index of the ion exchanged water of a dispersion medium as 1.333. The ingredients of each maintenance liquid and the average particle size of the colloidal silica are shown in Table 1.

TABLE 1

In Table 1, Bl represents Balance, PI represents Present invention and CE represents Comparative example.

| | Maintenance liquid | | | | | | | | |
|---|---|---|---|---|---|---|---|---|---|
| | A | B | C | D | E | F | G | H | I |
| Glycerin (Water-soluble organic solvent) | 20 | | | 20 | | 20 | 20 | | |
| Diethylene glycol monomethyl ether (Water-soluble organic solvent) | | 20 | 20 | | 20 | | | 20 | 20 |
| ACETYLENOL EH (Acetylene glycol surfactant) | 1 | | 1 | 1 | 1 | 1 | 1 | 1 | 1 |
| Benzotriazole (UV absorber) | | | | | | | | 0.008 | |
| SOFTANOL EP-7025 (Nonionic surfactant) | | | | | | | | 0.01 | |
| SNOWTEX XS (in terms of SiO$_2$) (Colloidal silica) | 0.001 | 0.01 | 0.1 | 1 | 5 | | | 0.1 | 0.01 |
| SNOWTEX XL (in terms of SiO$_2$) (Colloidal silica) | | | | | | 1 | | | |
| SNOWTEX MP-2040 (in terms of SiO$_2$) (Colloidal silica) | | | | | | | 1 | | |
| Sodium silicate (Water-soluble alkali metal silicate) | | | | | | | | | |
| Tetramethylammonium silicate (Water-soluble ammonium silicate) | | | | | | | | | |
| Ion-exchanged water | Bl | Bl | Bl | Bl | Bl | Bl | Bl | Bl | Bl |
| Average particle size (Colloidal silica nm) | 10 | 11 | 9 | 10 | 13 | 55 | 198 | 12 | 11 |
| pH | 8.5 | 8.5 | 8.5 | 8.5 | 8.5 | 8.5 | 8.5 | 8.5 | 6.8 |
| Remarks | PI | PI | PI | PI | PI | PI | PI | PI | PI |

| | Maintenance liquid | | | | | | | |
|---|---|---|---|---|---|---|---|---|
| | J | K | L | M | N | O | P | Q |
| Glycerin (Water-soluble organic solvent) | | | 20 | | | 20 | 20 | |
| Diethylene glycol monomethyl ether (Water-soluble organic solvent) | 20 | 20 | | 20 | 20 | | | 20 |
| ACETYLENOL EH (Acetylene glycol surfactant) | 1 | 1 | 1 | | 1 | 1 | 1 | 1 |
| Benzotriazole (UV absorber) | | 0.008 | | | | | | 0.008 |
| SOFTANOL EP-7025 (Nonionic surfactant) | | 0.01 | | | | | | 0.01 |
| SNOWTEX XS (in terms of SiO$_2$) (Colloidal silica) | | | | | | | | 0.08 |
| SNOWTEX XL (in terms of SiO$_2$) (Colloidal silica) | | | | | | | | |
| SNOWTEX MP-2040 (in terms of SiO$_2$) (Colloidal silica) | | | | | | | | |
| Sodium silicate (Water-soluble alkali metal silicate) | | | 0.001 | 0.01 | 0.1 | 1 | | 0.02 |
| Tetramethylammonium silicate (Water-soluble ammonium silicate) | | | | | | | 1 | 1 |
| Ion-exchanged water | Bl | Bl | Bl | Bl | Bl | Bl | Bl | Bl |
| Average particle size (Colloidal silica nm) | — | — | — | — | — | — | — | 13 |
| pH | 8.5 | 8.5 | 8.5 | 8.5 | 8.5 | 8.5 | 8.5 | 8.5 |
| Remarks | CE | CE | PI | PI | PI | PI | CE | PI |

(Production of Nozzle Plate 1)

A silicone resin (manufactured by Dow Corning Toray Silicone Co., Ltd.) was applied to an Ni electrocast nozzle surface (surface area: 4.0 cm$^2$) by a spray method to form a silicone layer having a thickness of about 1.0 μm. In the process, nozzle openings and the rear surface of a nozzle plate were masked by a water-soluble resin, a silicone layer was formed by application, and then separation removal was carried out for formation. Then, the resultant substance was heated and cured at 200° C. for 1 hour to form an ink-repellent layer, thereby producing a nozzle plate 1 containing a Ni/silicone resin.

(Production of Nozzle Plate 2)

A nozzle plate 2 having a Ni/PTFE (polytetrafluoroethylene) co-deposited layer formed on a Ni electrocast nozzle surface (surface area: 4.0 cm$^2$) by electric field plating as an ink-repellent layer was produced.

(Production of Silicon Plate and SAM Film)

A silicon plate (surface area: 4.0 cm$^2$) formed from a thermal oxidation SiO$_2$ layer to be used for a silicon liquid chamber and a SAM (self-assembled monolayer) film plate (surface area: 4.0 cm$^2$) in which a fluorinated alkyl silane compound was formed on the silicon plate formed from the oxidization SiO$_2$ layer were produced.

[Production of Ink for Evaluation]

(Production of Water-Insoluble Polymer: Polymer Production Example)

In a reactor, 25 parts of methyl ethyl ketone, 0.03 part of a polymerization chain transfer agent (2-mercaptoethanol), and 10% of 200 parts of each monomer shown in Table 2 were put in, and mixed. Then, nitrogen gas replacement was sufficiently performed, thereby obtaining a mixed solution.

Separately, 90% of the remaining monomers shown in Table 2 was charged in a dropping funnel, 0.28 part of a polymerization chain transfer agent, 60 parts of methyl ethyl ketone, and 1.2 parts of a radical polymerization initiator (2,2'-azobis (2,4-dimethylvaleronitrile)) were put in, and mixed. Then, nitrogen gas replacement was sufficiently performed, thereby obtaining a mixed solution.

The temperature was increased to 65° C. under a nitrogen atmosphere while stirring the mixed solution in the reactor, and the mixed solution in the dropping funnel was gradually added dropwise over 3 hours. After 2 hours passed at 65° C. after the completion of the dropwise addition, a solution in which 0.28 part of the radical polymerization initiator was dissolved in 5 parts of methyl ethyl ketone was added. Then, the mixture was aged at 65° C. for 2 hours and then at 70° C. for 2 hours, thereby obtaining a polymer solution.

The weight average molecular weight of the obtained water-insoluble polymer was measured by the following method, and a water-insoluble polymer solution having a mass average molecular weight of 56000 was obtained.

TABLE 2

| Monomer type | | Parts by mass of solid content (Exemplified Aspect of Polymer production) |
|---|---|---|
| | (a) Methacrylic acid | 16 |
| | (b) Styrene macromer | 10 |
| | (c) Benzyl methacrylate | 34 |
| | (c) Styrene monomer | 10 |
| | (d) PP-800 | 15 |
| | (d) 43PAPE-600B | 15 |

The details of the compounds shown in Table 2 are as follows:
(b) Styrene macromer: manufactured by TOAGOSEI Co., LTD., Trade name: AS-6 (S) (Number average molecular weight: 6000, Polymerizable functional group: Methacryloyloxy group)
(d) PP-800: manufactured by Nippon Oil & Fats Co., Ltd., Trade name: BLENMER PP-800, polypropylene glycol monomethacrylate (Average number of moles of propylene oxide = 12, Terminal: Hydroxy group)
(d) 43PAPE-600B: manufactured by Nippon Oil & Fats Co., Ltd., Trade name: BLENMER 43PAPE-600B, polyethylene glycol polypropylene glycol monomethacrylate (Average number of moles of ethylene oxide = 6, Average number of moles of propylene oxide = 6, Terminal: phenyl group).

[Measurement of Weight Average Molecular Weight (Mw) of Water Insoluble Polymer]

The measurement was performed using polystyrene as a standard substance by gel chromatography method using, as a solvent, N,N-dimethyl formamide containing 60 mmol/L of phosphoric acid and 50 mmol/L of lithium bromide. The measurement was performed under the conditions: Used column: TSK-GEL,α-M×2 pieces (trade name), manufactured by Tosoh Corporation, Main body: HLC-8120GPC (trade name), manufactured by Tosoh Corporation, and Flow velocity: 1 mL/min.

(Production Example of Pigment Dispersion Substance)

12.5 parts of a water-insoluble polymer obtained by vacuum drying the water-insoluble polymer solution obtained in the polymer production example was dissolved in 113.3 parts of methyl ethyl ketone. Subsequently, 4.4 parts (Neutralization degree of 80%) of a neutralizer (5 mol/L aqueous sodium hydroxide solution) and 339.7 parts of ion exchanged water were added thereto to neutralize a salt-producing group, and 37.5 parts of a dimethyl quinacridone pigment (C. I. pigment red 122, manufactured by Ciba Specialty Chemcals, Trade name: CROMOPHTAL JET MAGENTA DMQ) was added, and then mixed at 20° C. for 1 hour with a disper blade. The obtained mixture was processed for 6 hours by a sand mill (Bessel: zirconia, Rotor: zirconia, Rotor outer diameter: 70 mm, Beads: zirconia, Beads packing fraction: 65%, and Number of rotations: 2,000 rotation/minute). The resultant substance was filtered through a 200 mesh wire net, and the obtained dispersion liquid was subjected to 10 path dispersion treatment at a pressure of 140 MPa using a microfluidizer.

Methyl ethyl ketone was removed at 60° C. from the obtained dispersion liquid under a reduced pressure, and further water was partially removed, thereby obtaining a magenta pigment dispersion A of a pigment-containing water-insoluble polymer particles having a pigment concentration of 20% by mass.

The magenta pigment dispersion as described above was adjusted based on the following ink composition, and then filtered through a 0.2 micrometer membrane filter, thereby producing a magenta ink (hereinafter referred to as "ink").

(Ink Composition)

| | |
|---|---|
| Magenta pigment dispersion A | 25 parts |
| Glycerin | 10 parts |
| Triethylene glycol monobutyl ether | 10 parts |
| Surfinol 465 | 1 part |
| Proxel XL2 | 0.3 part |
| Ion exchanged water | Balance to give the total amount of 100 parts |

(Washability Test 1)

1 μL of the ink described above was added dropwise onto each plate produced as described above, dried at room temperature for 60 minutes, and 10 μL of each maintenance liquid obtained in the above was added dropwise to the dried ink. 10 seconds after, the solidified ink on each plate was wiped off once in one direction under a load of 200 g, and the adhered ink on a nozzle member was visually observed. When the solidified ink was adhered, 10 μL of the maintenance liquid was further added dropwise onto the dried ink. 10 seconds after, the ink droplets on each plate were wiped off once in one direction under a load of 200 g, and the process was repeated. Then, the removal of the adhered substance was visually observed, and the ink washability was evaluated in accordance with the following evaluation criteria. The results are shown in Table 3.

3: Adhered ink was removed by one operation.

2: Adhered thing was removed by two operations.

1: Adhered ink was observed even after three operations.

(Durability Test 1)

A liquid repellent film of each plate produced as described above was measured for the contact angle.

Thereafter, 30 ml of each maintenance liquid shown in Table 1 was weighed in a 50 ml polypropylene jar (50 ml I-BOY (trade name) (manufactured by As One Corp.)), and each plate produced as described above was immersed. The nozzle plates 1 and 2 and the silicon plate were heated at 60° C. for 1000 hours and the SAM film plate was heated at 60° C. for 72 hours. Then, each plate was taken out, and washed with ultrapure water. Then, the contact angle of the surface of the liquid repellent film was measured again, and the changes in the contact angle before and after the immersion were calculated (Changes=Contact angle after immersion/Contact angle before immersion×100). For the measurement of the contact angle, ultrapure water was used. 1.0 μl of the ultrapure water was added dropwise to each plate using DROPMASTER DM700 (trade name, manufactured by Kyowa Interface Science Co., LTD.), and the contact angle was measured as an contact angle when 0.30 second passed. The measurement results are shown in Table 1. The evaluation was performed in accordance with the following evaluation criteria. The results are shown in Table 3.

5: Changes in the contact angle before and after the immersion were lower than 10%.

4: Changes in the contact angle before and after the immersion were 10% or more and lower than 20%.

3: Changes in the contact angle before and after the immersion were 20% or more and lower than 50%.

2: Changes in the contact angle before and after the immersion were 50% or more and lower than 100%.

1: The contact angle after the immersion could not measured.

In Table 3, PI represents Present invention and CE represents Comparative example.

TABLE 3

|  |  | Maintenance liquid | | | | | | | | | | | | | | | | |
|---|---|---|---|---|---|---|---|---|---|---|---|---|---|---|---|---|---|
|  |  | A | B | C | D | E | F | G | H | I | J | K | L | M | N | O | P | Q |
| Washability test 1 | Nozzle plate 1 | 3 | 3 | 3 | 3 | 3 | 3 | 3 | 3 | 2 | 2 | 2 | 3 | 3 | 3 | 3 | 3 | 3 |
|  | Nozzle plate 2 | 3 | 3 | 3 | 3 | 3 | 3 | 3 | 3 | 2 | 2 | 2 | 3 | 3 | 3 | 3 | 3 | 3 |
|  | Silicon plate | 3 | 3 | 3 | 3 | 3 | 3 | 2 | 3 | 2 | 2 | 2 | 3 | 3 | 3 | 3 | 3 | 3 |
|  | SAM film plate | 3 | 3 | 3 | 3 | 2 | 3 | 2 | 3 | 3 | 1 | 1 | 3 | 3 | 3 | 3 | 3 | 3 |
| Durability test 1 | Nozzle plate 1 | 4 | 5 | 5 | 5 | 5 | 4 | 5 | 5 | 5 | 2 | 2 | 4 | 5 | 5 | 5 | 5 | 5 |
|  | Nozzle plate 2 | 4 | 5 | 5 | 5 | 5 | 4 | 5 | 5 | 5 | 2 | 2 | 4 | 5 | 5 | 5 | 5 | 5 |
|  | Silicon plate | 3 | 5 | 5 | 5 | 5 | 5 | 5 | 5 | 5 | 1 | 2 | 3 | 5 | 5 | 5 | 5 | 5 |
|  | SAM film plate | 3 | 5 | 5 | 3 | 4 | 3 | 5 | 5 | 5 | 1 | 1 | 3 | 5 | 5 | 5 | 2 | 5 |
| Remarks |  | PI | PI | PI | PI | PI | PI | PI | PI | PI | CE | CE | PI | PI | PI | PI | CE | PI |

(Jetting Recovery Property Test 1)

Ink heads were produced using the nozzle plates 1 and 2 and the SAM film plate produced as described above, and were provided to a piezo type inkjet recording evaluation printer (hereinafter referred to as a "evaluation printer"). Then, the following evaluation was performed. The evaluation was performed under the conditions of a driving frequency of 30 kHz, an amount of ink liquid droplets of 3.8 pl, a number of nozzles of 512 (128 nozzles per color), and a recording resolution of 1440×1440 dpi (The dpi as used in the invention represents the number of dots per 2.54 cm). 2000 sheets of images having 10 pieces of 1 cm×10 cm wedge charts at intervals in a A4 size page were continuously printed at 23° C. and at 20% RH, the produced maintenance liquid was supplied to the nozzle surface, and a wipe operation (cleaning operation) using a rubber braid was carried out once. After wiping, 20 sheets of images having 10 pieces of 1 cm×10 cm wedge charts at intervals in a A4 size page were continuously printed, the obtained images were visually observed, and the jetting recovery properties were confirmed. Subsequently, the line head was removed, the head jetting surface was visually observed, and the jetting recovery properties were evaluated in accordance with the following criteria. The results are shown in Table 4.

3: No ink residues were observed in the head jetting surface, and the jetting was also stable.

2: No ink residues were observed in the head jetting surface, ink dropping occurred in the printed images.

1: Ink residues were observed in the head jetting surface, and a large number of ink dropping occurred in the printed images.

(Jetting Recovery Property Test 2)

A jetting recovery property test 2 was carried out using the evaluation printer. The wipe operation with a rubber braid after supplying each maintenance liquid to the nozzle surface was repeated 1000 times, and then 20 sheets of images having 10 pieces of 1 cm×10 cm wedge charts at intervals in a A4 size page were continuously printed, the obtained images were visually observed, and the jetting recovery properties were confirmed. Subsequently, the head was removed, the head jetting surface was visually observed, and the jetting recovery properties were evaluated in accordance with the following criteria. The results are shown in Table 4.

3: No ink residues were observed in the head jetting surface, and the jetting was also stable.

2: No ink residues were observed in the head jetting surface, ink dropping occurred in the printed images.

1: Ink residues were observed in the head jetting surface, and a large number of ink dropping occurred in the printed images.

(Durability Test 2)

The head materials (Nozzle plates 1 and 2 and SAM film plate) after repeatedly performing the wipe operation in the durability test 1 were measured for the contact angle. For comparison, each head material before the wipe operation was measured for the contact angle for judging whether or not the liquid repellency of each nozzle material was maintained based on changes in the contact angle (Changes=Contact angle after immersion/Contact angle before immersion× 100), and then evaluation was performed in accordance with the following evaluation criteria.

5: Changes in the contact angle before and after the wipe operation were lower than 10%.

4: Changes in the contact angle before and after the wipe operation were 10% or more and lower than 20%.

3: Changes in the contact angle before and after the wipe operation were 20% or more and lower than 50%.

2: Changes in the contact angle before and after the wipe operation were 50% or more and lower than 100%.

1: The contact angle after the wipe operation could not measured.

2009-12361 and 2008-274016 do not satisfy high durability required in the inkjet recording devices and, in particular, do not sufficiently prevent the corrosion of the inkjet head members or materials containing silicon (Si). For example, the corrosion problem is noticeable in a liquid repellent member having a self-assembled monolayer (SAM film) formed in $SiO_2$ base or the like.

The preset invention can provide a maintenance liquid that can be used for maintenance in inkjet recording devices, is excellent in washability, is excellent in durability against members constituting inkjet recording devices, and can maintain high image printing performance after maintenance.

The present invention can also provide an ink set containing the maintenance liquid that can be used for maintenance in inkjet recording devices, is excellent in washability, is excellent in durability against members constituting inkjet recording devices, and can maintain high image printing performance after maintenance and an image forming method capable of forming excellent images using the ink set.

All publications, patent applications, and technical standards mentioned in this specification are herein incorporated by reference to the same extent as if each individual publication, patent application, or technical standard was specifically and individually indicated to be incorporated by reference.

What is claimed is:

1. A maintenance method comprising washing, with a maintenance liquid, at least a part of an inkjet recording head that discharges an aqueous ink composition, which includes a colorant, to form an image, the inkjet recording head comprising a nozzle plate which is selected from the group consisting of: (i) a silicon plate having a thermal oxidation $SiO_2$ layer, and (ii) a self-assembled monolayer film plate in which a fluorinated alkyl silane compound is formed on an oxidation $SiO_2$ layer provided on a silicon plate; and the maintenance liquid comprising water, a water-soluble organic solvent, and colloidal silica.

2. The maintenance method according to claim 1, wherein the colorant is a resin-coated pigment.

3. The maintenance method according to claim 1, wherein a pH value at 25° C. of the maintenance liquid is from 7 to 12.

TABLE 4

In Table 4, PI represents Present invention and CE represents Comparative example.

| | | Maintenance liquid | | | | | | | | | | | | | | | |
|---|---|---|---|---|---|---|---|---|---|---|---|---|---|---|---|---|---|
| | | A | B | C | D | E | F | G | H | I | J | K | L | M | N | O | P | Q |
| Jetting recovery property test 1 | Nozzle plate 1 | 3 | 3 | 3 | 3 | 3 | 3 | 3 | 3 | 3 | 2 | 2 | 3 | 3 | 3 | 3 | 2 | 3 |
| | Nozzle plate 2 | 3 | 3 | 3 | 3 | 3 | 3 | 3 | 3 | 2 | 2 | 2 | 3 | 3 | 3 | 3 | 2 | 3 |
| | SAM film plate | 2 | 3 | 3 | 3 | 3 | 3 | 3 | 3 | 3 | 1 | 1 | 3 | 3 | 3 | 3 | 1 | 3 |
| Jetting recovery property test 2 | Nozzle plate 1 | 3 | 3 | 3 | 3 | 3 | 3 | 2 | 3 | 3 | 1 | 1 | 3 | 3 | 3 | 3 | 2 | 3 |
| | Nozzle plate 2 | 2 | 3 | 3 | 3 | 3 | 3 | 2 | 3 | 2 | 1 | 1 | 3 | 3 | 3 | 3 | 2 | 3 |
| | SAM film plate | 2 | 3 | 3 | 3 | 3 | 3 | 3 | 3 | 3 | 1 | 1 | 3 | 3 | 3 | 3 | 1 | 3 |
| Durability test 2 | Nozzle plate 1 | 4 | 5 | 5 | 5 | 5 | 5 | 4 | 5 | 5 | 3 | 3 | 4 | 5 | 5 | 5 | 5 | 5 |
| | Nozzle plate 2 | 4 | 5 | 5 | 5 | 5 | 5 | 4 | 5 | 5 | 2 | 2 | 4 | 5 | 5 | 5 | 5 | 5 |
| | SAM film plate | 3 | 5 | 5 | 5 | 5 | 4 | 3 | 5 | 5 | 1 | 1 | 4 | 5 | 5 | 5 | 3 | 5 |
| Remarks | | PI | PI | PI | PI | PI | PI | PI | PI | PI | CE | CE | PI | PI | PI | PI | CE | PI |

As is clear from Tables, the Examples of the invention were excellent in all the evaluations. In contrast, the Comparative Examples were inferior to the Examples in some of the evaluations.

The member constituting inkjet recording devices have been diversified, and the inventions described in JP-A Nos.

4. The maintenance method according to claim 1, wherein a volume average particle size of the colloidal silica is from 1 nm to 100 nm.

5. The maintenance method according to claim 1, wherein a total content of the colloidal silica in the maintenance liquid is from 0.01% to 10% by mass with respect to a total amount of the maintenance liquid.

6. The maintenance method according to claim 1, wherein a content of the water-soluble organic solvent in the maintenance liquid is from 0.1% by mass to 50% by mass with respect to a total amount of the maintenance liquid.

7. The maintenance method according to claim 1, wherein the maintenance liquid further comprises an acetylene diol surfactant.

8. The maintenance method according to claim 1, wherein a pH value at 25° C. of the aqueous ink composition is from 6.5 to 12.

9. The maintenance method according to claim 1, wherein the maintenance liquid further comprises a water-soluble silicate represented by the following Formula (I):

$$xM_2O \cdot ySiO_2 \quad \text{Formula (1):}$$

wherein, in Formula (1), M represents K or Na, x represents 1 or 2, and y represents an integer of 1 to 5.

10. The maintenance method according to claim 9, wherein a total content of the water-soluble silicate and the colloidal silica in the maintenance liquid is from 0.01% to 10% by mass with respect to a total amount of the maintenance liquid.

* * * * *